(12) United States Patent
Onuma et al.

(10) Patent No.: US 7,683,514 B2
(45) Date of Patent: Mar. 23, 2010

(54) HYBRID MAGNETIC BEARING

(75) Inventors: Hiroyuki Onuma, Iruma (JP); Toru Masuzawa, Hitachi (JP); Yohji Okada, Hitachi (JP)

(73) Assignee: Iwaki Co., Ltd (JP)

( * ) Notice: Subject to any disclaimer, the term of this patent is extended or adjusted under 35 U.S.C. 154(b) by 60 days.

(21) Appl. No.: 11/988,773

(22) PCT Filed: Aug. 30, 2006

(86) PCT No.: PCT/JP2006/317143

§ 371 (c)(1),
(2), (4) Date: Jan. 14, 2008

(87) PCT Pub. No.: WO2007/049396

PCT Pub. Date: May 3, 2007

(65) Prior Publication Data

US 2009/0079284 A1    Mar. 26, 2009

(30) Foreign Application Priority Data

Oct. 28, 2005    (JP)    ............................. 2005-313989

(51) Int. Cl.
*H02K 7/09*    (2006.01)
(52) U.S. Cl. ...................... 310/90.5; 310/181
(58) Field of Classification Search ................ 310/90.5, 310/181
See application file for complete search history.

(56) References Cited

U.S. PATENT DOCUMENTS

| 5,036,236 A | | 7/1991 | Wilson |
| 5,250,865 A | | 10/1993 | Meeks |
| 5,355,042 A | * | 10/1994 | Lewis et al. ................. 310/90.5 |
| 5,947,703 A | | 9/1999 | Nojiri et al. |
| 6,121,704 A | * | 9/2000 | Fukuyama et al. ......... 310/90.5 |

(Continued)

FOREIGN PATENT DOCUMENTS

JP    59-43220 A    3/1984

(Continued)

OTHER PUBLICATIONS

"PCT Application No. PCT/JP2006/317143, International Search Report mailed Nov. 28, 2006", 2 pgs.

(Continued)

*Primary Examiner*—Dang D Le
(74) *Attorney, Agent, or Firm*—Schwegman, Lundberg & Woessner, P.A.

(57) ABSTRACT

In a hybrid magnetic bearing, the electromagnet has a core wound with a control coil and has a main pole and a commutating pole with a commutating pole permanent magnet provided approximately parallel to each other at predetermined intervals in a protruding condition radially or axially to the rotor. In the magnetic bearing provided radially, two electromagnets are placed oppositely to each other across the rotor in an approximately horizontal position, and the rotor is arranged so as to have a predetermined gap with the main pole and the commutating pole, and the permanent magnet is provided between the adjacent electromagnets. In the magnetic bearing provided axially, two electromagnets are placed in parallel in an approximately horizontal position, and the rotor is arranged so as to have a predetermined gap with the main pole and the commutating pole, and the permanent magnet is provided between the adjacent electromagnets.

7 Claims, 13 Drawing Sheets

U.S. PATENT DOCUMENTS

| | | |
|---|---|---|
| 6,181,040 B1 | 1/2001 | Schob |
| 6,563,244 B1 | 5/2003 | Yamauchi et al. |
| 2002/0094281 A1 | 7/2002 | Khanwilkar et al. |

FOREIGN PATENT DOCUMENTS

| | | |
|---|---|---|
| JP | 59-83829 A | 5/1984 |
| JP | 11-101234 | 4/1999 |
| JP | 2001-41238 | 2/2001 |
| JP | 2002-512333 | 4/2002 |
| JP | 2005-121157 | 5/2005 |
| WO | WO 84/01802 A1 | 5/1984 |
| WO | WO 99/53974 A2 | 10/1999 |

OTHER PUBLICATIONS

"Chinese Application Serial No. 200680039941X, Office Action (with partial English translation) dated Jul. 17, 2009", 10 pgs.

"European Application Serial No. 06797115.0, Supplementary European Search Report dated Jul. 28, 2009", 8 pgs.

"International Application Serial No. PCT/JP2006/317143, Written Opinion mailed Nov. 28, 2006", (w/ English Translation), 8 pgs.

"Korean Application Serial No. 10-2008-7006525, Office Action dated Aug. 31, 2009", (w/ partial English Translation), 8 pgs.

* cited by examiner

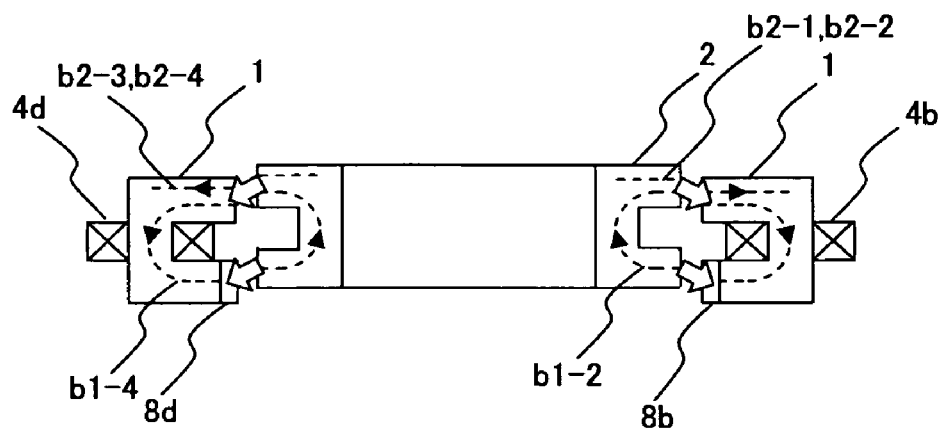
(a)
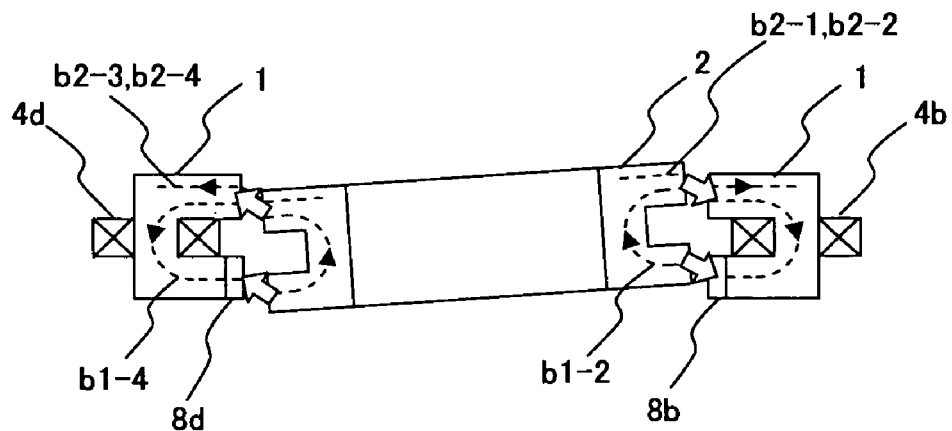
(b)
FIG. 4

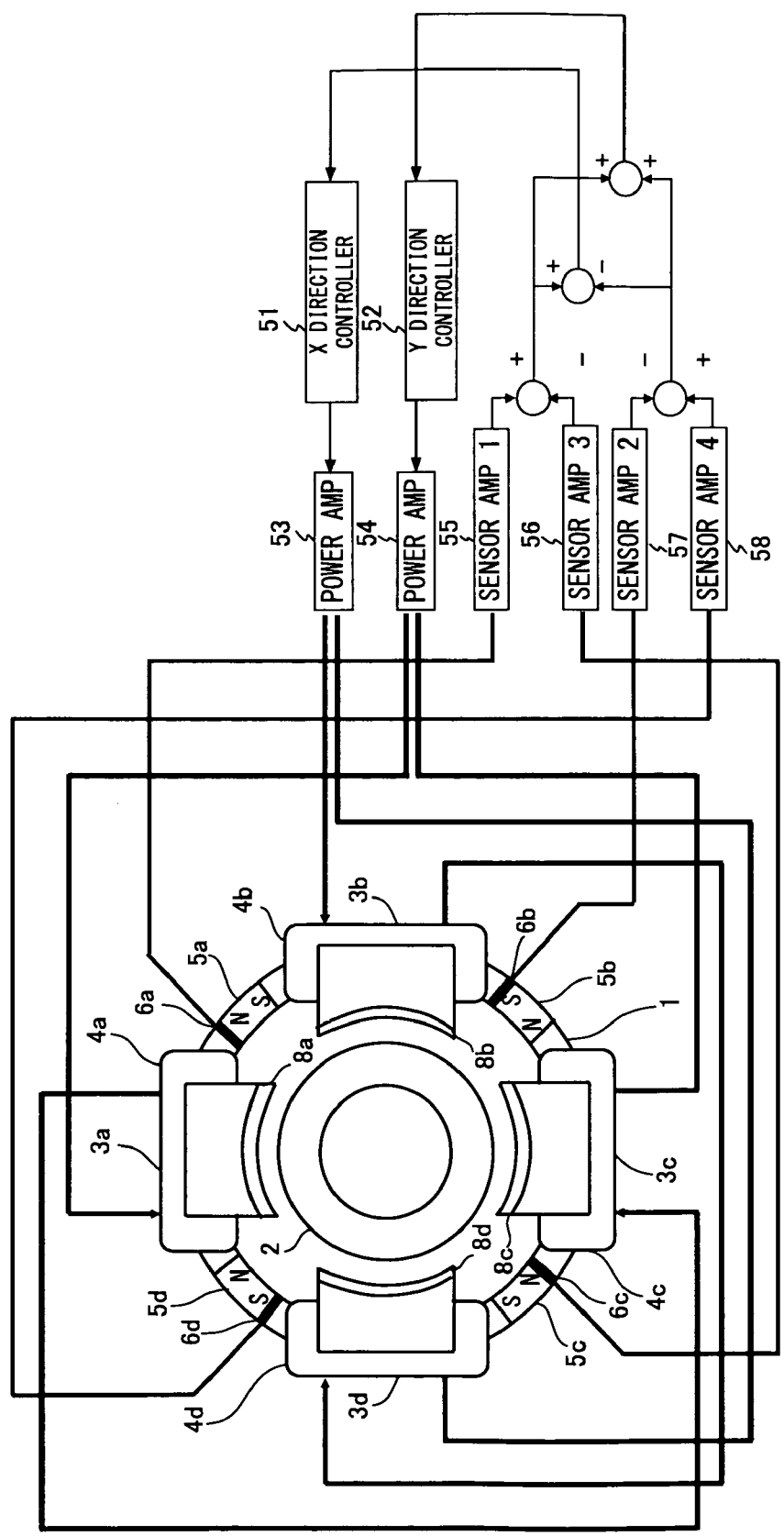
F I G. 5

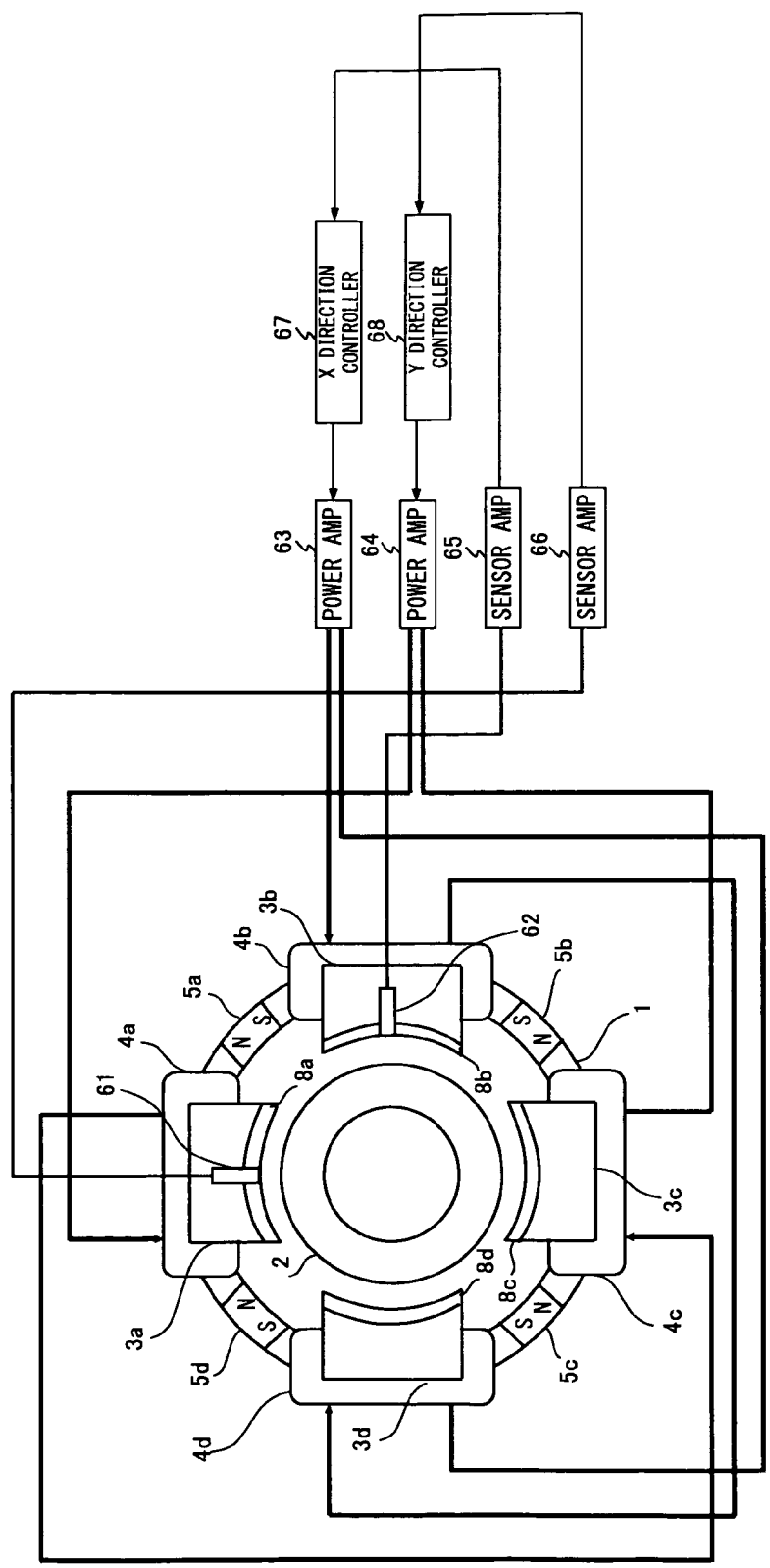
F I G. 6

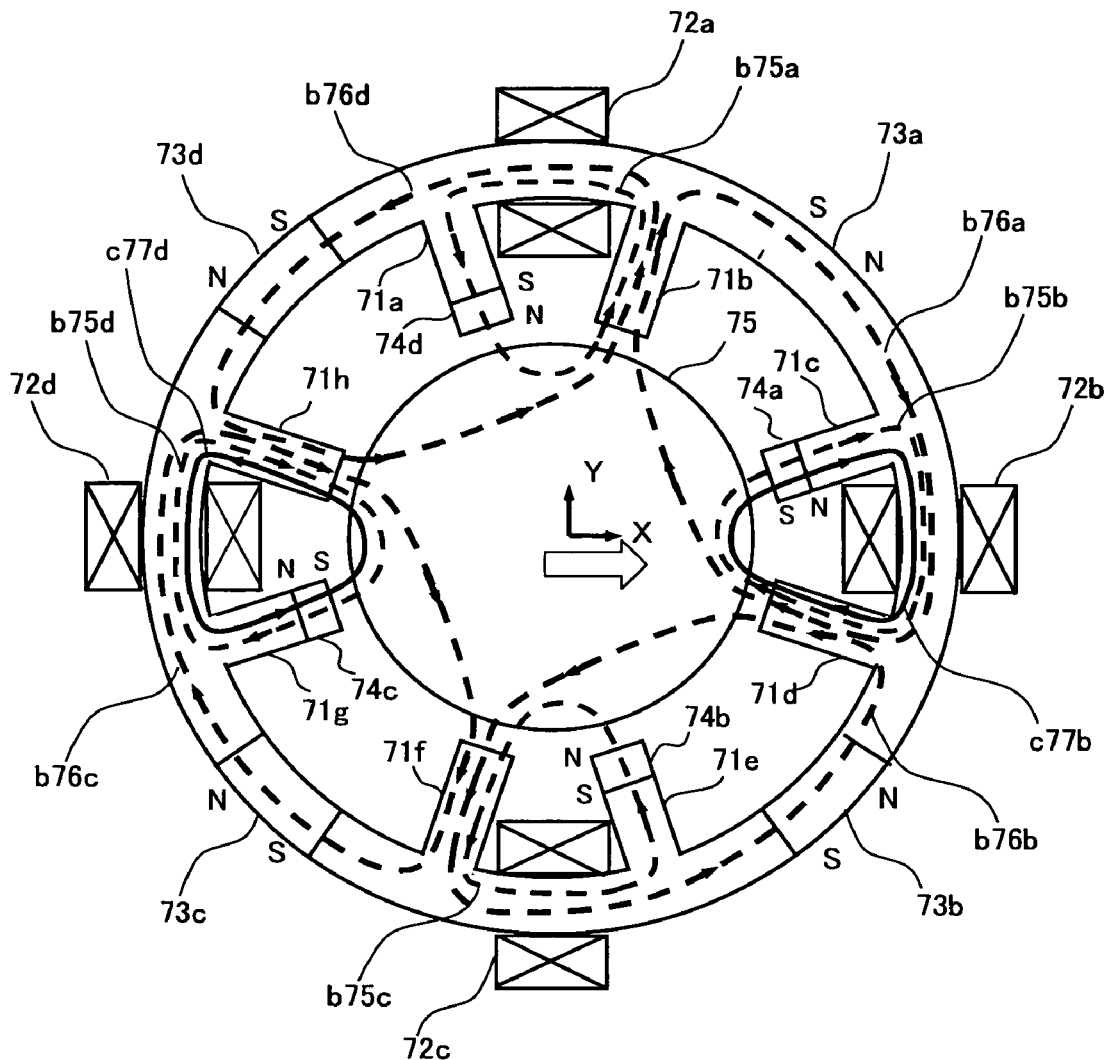
F I G. 8

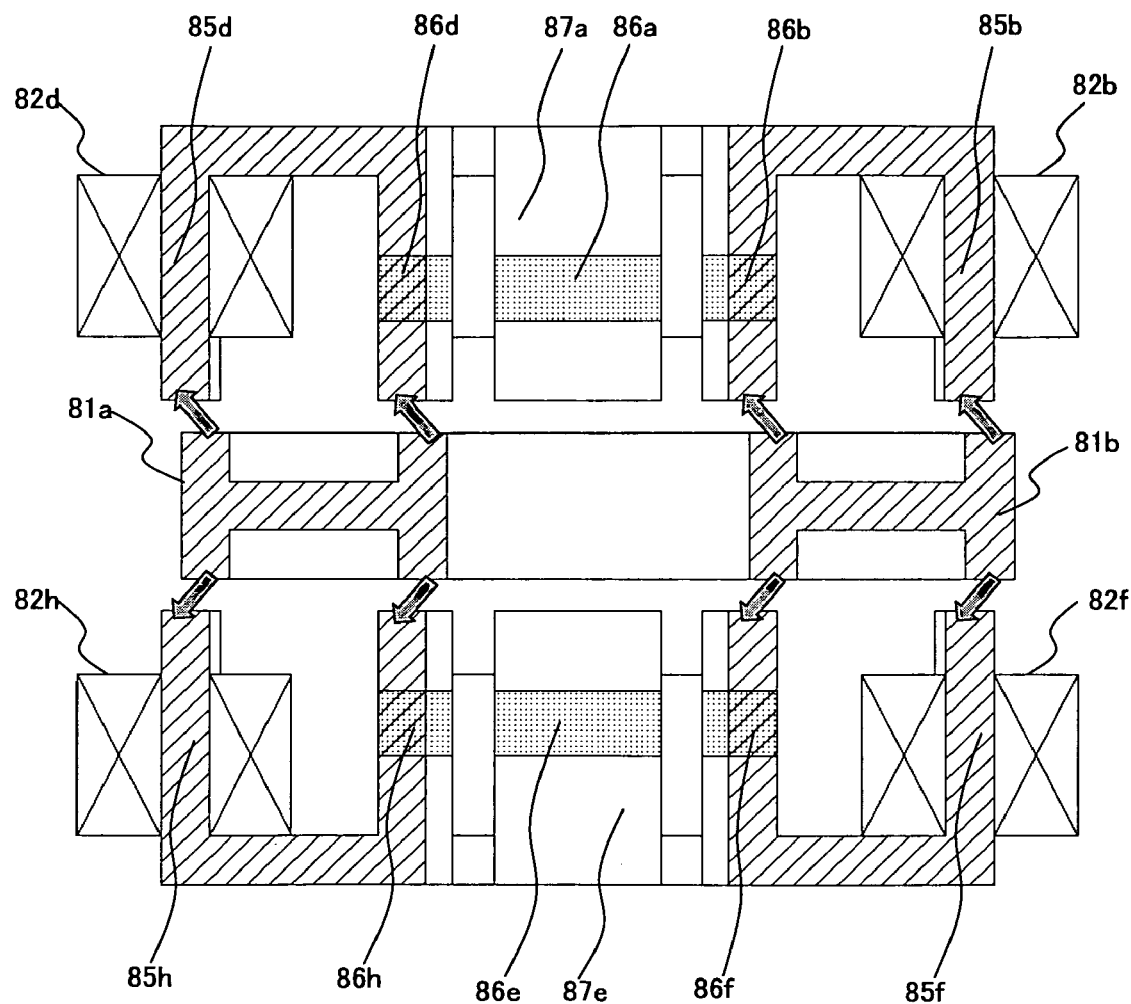
F I G. 1 2

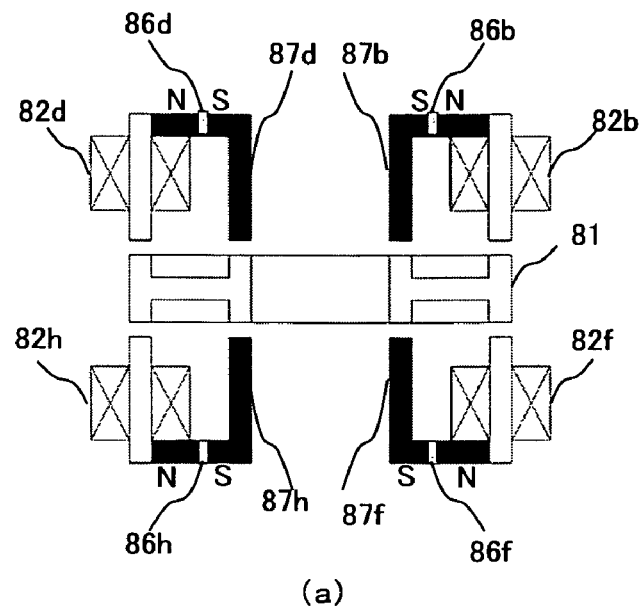
(a)
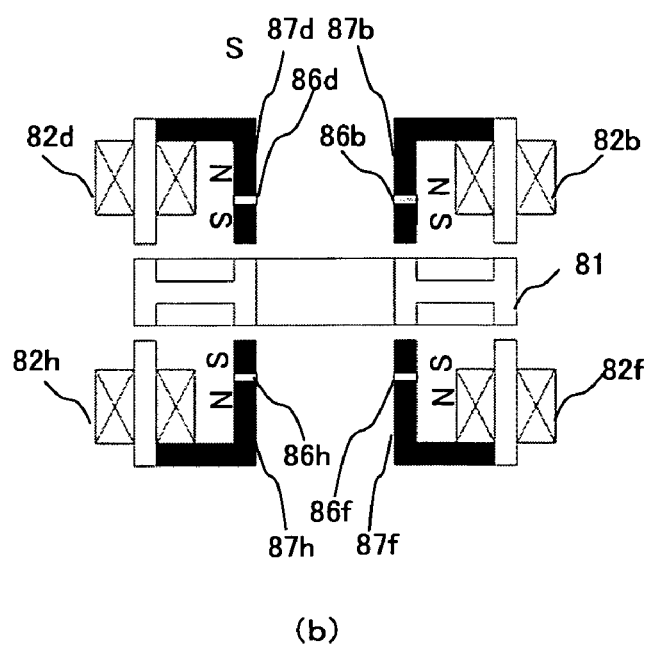
(b)
FIG. 13

HYBRID MAGNETIC BEARING

RELATED APPLICATION

This application is a nationalization under 35 U.S.C. 371 of PCT/JP2006/317143, filed Aug. 30, 2006 and published as WO 2007/049396 A1 on May 3, 2007, which claimed priority under U.S.C. 119 to Japanese Application No. 2005-313989, filed Oct. 28, 2005, which applications and publication are incorporated herein by reference and made a part hereof.

TECHNICAL FIELD

The present invention relates to a hybrid magnetic bearing that suspends a rotor by magnetic force without contact, and particularly to a technology that allows an electromagnet to reduce power consumption and to improve responses to a control by employing the bias flux of a permanent magnet.

BACKGROUND ART

With the technological development in recent years of a magnetic bearing that suspends a rotor without contact, magnetic bearings are being used for various types of bearings. A magnetic bearing utilizes an electromagnet and requires a large amount of electrical current to levitate a rotor, resulting in a large power consumption. Therefore, in order to obtain a large amount of magnetic force with a small amount of current, the space between the rotor and stator is required to be narrow. Additionally, a high work accuracy is required. For those reasons, a hybrid magnetic bearing utilizing the bias flux of a permanent magnet is used.

One basic configuration of the hybrid magnetic bearing has a magnetized permanent magnet sandwiched in the axial direction between two radial magnetic bearings disposed at a distance from each other in the rotation axis direction of the rotor, and one of the radial bearings is made to be the positive pole. Another radial bearing is bias-magnetized to have the negative pole. By increasing the bias flux generated in the above manner in one of the radial directions and decreasing the bias flux in the other direction with a magnetizing coil, radial attraction is controlled.

A single radial magnetic bearing modified to be a hybrid type for the purpose of size reduction is also known. A magnetic bearing disclosed in Patent Document 1 has a first magnetic pole face that is one of the outer peripheral faces of a group of magnetic members in a ring-shaped rotor that consists of a permanent magnet magnetized in an axial direction sandwiched between the magnetic members from the axial direction. Another outer peripheral face of the magnetic members is the second magnetic pole face. The periphery of the rotor has a stator with four electromagnets, and each of the four electromagnets is mounted oppositely to the magnetic pole face of the rotor. It has been proposed to have passive magnetic support of the axial direction and to allow a tilting in the rotor by having such a configuration that connects the rotor and the stator by strong magnetic force.

Patent Document 2 proposes a magnetic bearing having a configuration of a magnetic bearing in which a rotor in the center has angulated U-shaped electromagnets arranged around its circumference at regular intervals, and the electromagnets are connected so that the magnetized directions are arranged alternately, said arranging being performed by a permanent magnet magnetized in the circumferential direction.

Patent Document 3 proposes a magnetic bearing having a configuration in which a permanent magnet magnetized in a radial direction is placed so as to cover the end of a stator having plural salient poles, providing a bias flux.

However, the magnetic bearings disclosed in Patent Documents 1 and 3 are of configurations in which a permanent magnet is arranged on a magnetic path where the flux of a control coil travels, and because the permanent magnet is a gap for the control flux, there is a limit to the amount that the control force can be increased by increasing the bias flux and increasing the thickness of the permanent magnet.

Although the magnetic bearing disclosed in Patent Document 2 can generate a strong control force if the control is in the X axis direction only or in the Y axis direction only, the simultaneous control of the X axis and Y axis causes a problem such that the strong control force cannot be generated because the control flux is being interfered with.

Because the magnetic bearing suspends a rotor without contact, the magnetic levitation is normally unstable and therefore needs to be stabilized by detection of the position of levitation and by feedback control. As a sensor detecting the position of levitation, an eddy-current sensor and an inductor sensor are used; however, these are generally expensive. In addition, if the magnetic bearing and the sensor have to be separately placed, the stability range of the feedback system will be small and there might be difficulty in stabilization. In particular, magnetic bearings for ultra-small rotors have been sought in recent years, and limitations in the sensor placement space are a problem in reducing the size.

There exists position detection of the magnetic bearing using a self-sensing technology that utilizes the electromagnet of the magnetic bearing as a sensor. When the position of a rotor changes, the magnetic pole inductance changes as the distance (gap) from the magnetic pole of the magnetic bearing to the rotor changes. By detecting the change in the inductance using any appropriate method, the gap can be estimated. The methods that have been attempted include a method of estimating displacement of a rotor on the basis of the electrical current or voltage of the high-frequency component by overlapping the magnetizing coil of an electromagnet with a high-frequency signal, and a method of establishing a mathematical model of the rotor/magnetic bearing system and generating an observation of the displacement estimation on the basis of the model. However, the magnetic bearing employing the self-sensing has a problem in that estimation accuracy of the position is lower than that of a method that employs a displacement sensor separately.

Patent Document 1:
Japanese Patent Application Publication No. 2005-121157

Patent Document 2:
Japanese Patent Application Publication No. 2001-41238

Patent Document 3:
Japanese Patent Application Publication No. H11-101234

DISCLOSURE OF THE INVENTION

According to the present invention, a hybrid magnetic bearing that is highly controllable, and can realize high stiffness, high efficiency, and reduction in size is described.

One mode of the present invention is a hybrid magnetic bearing having a rotor that rotates while being suspended without contact by controlling the magnetic force of a plurality of electromagnets and permanent magnets, whereby each electromagnet has a main pole and a commutating pole having a commutating pole permanent magnet provided approximately parallel to each other at predetermined intervals provided in a protruding condition radially to the rotor, the electromagnet has a control coil wound around a core (magnetic core) having a main pole and a commutating pole, two of the electromagnets are placed oppositely to each other across the rotor in an approximately horizontal position, the rotor is arranged so as to have a predetermined gap with the main pole and the commutating pole, and the permanent magnet is provided between adjacent electromagnets.

Preferably, the configuration can be such that the commutating pole permanent magnet is arranged so that its polarity is the same as the polarity of the commutating pole in the electromagnet placed oppositely, and its polarity is different from the polarity of the commutating pole of the adjacent electromagnet, and the polarity of the permanent magnet arranged so as to sandwich the electromagnet is placed so that its polarity, which is different from the polarity of the commutating pole permanent magnet, is oriented toward the electromagnet.

In addition, it is preferable for the control coil to generate a control flux in the same or opposite direction to a first bias flux generated by the commutating pole permanent magnet and a second bias flux generated by the permanent magnet, and to control the position of the rotor.

The control flux can detect a change in the second bias flux with a flux sensor, and adjust the electrical current of the control coil according to the detected result.

The control flux can detect a change in the position of the rotor with a displacement sensor, and adjust electrical current of the control coil according to the detected result.

Preferably, the commutating pole permanent magnet is arranged within a range from the end of the commutating pole to a core unit between the main pole and the commutating pole.

The distance between the commutating pole and the rotor can be longer than the distance between the main pole and the rotor.

Another mode of the present invention is a hybrid magnetic bearing having a rotor that rotates while being suspended without contact by the control of the magnetic force of a plurality of electromagnets and permanent magnets, whereby the hybrid magnetic bearing has an upper magnetic bearing and a lower magnetic bearing arranged at its top and bottom so that the rotor is sandwiched and there is a predetermined gap; the upper magnetic bearing and the lower magnetic bearing have a plurality of the electromagnets and each electromagnet has a main pole and a commutating pole having a commutating pole permanent magnet provided approximately parallel to each other at predetermined intervals in a protruding condition axially to the rotor, and each electromagnet further has a control coil wound around a core (magnetic core) having the main pole and the commutating pole; a permanent magnet is provided between electromagnets provided in the upper magnetic bearing and is also provided between the electromagnets in the lower magnetic bearing; and an end plane of the main pole of the upper magnetic bearing and an end plane of the main pole of the lower magnetic bearing are arranged oppositely to each other across the rotor.

Preferably, the polarities of the ends of the commutating poles in the adjacent electromagnets are arranged to be different, and the polarity of the permanent magnet arranged so as to sandwich the main pole of the electromagnet is arranged so that polarity different from the polarity of the end of the commutating pole permanent magnet is oriented toward the direction of the main pole of the electromagnet.

It is possible for the control coil to generate a control flux in the same or opposite direction to a first bias flux generated by the commutating pole permanent magnet and a second bias flux generated by the permanent magnet, and to thereby control the position of the rotor.

According to the above configuration, the magnetic force in the axial direction is controlled by controlling the control flux with a magnetized coil wound on each electromagnet.

The control force can be further enhanced by the bias flux, and a high efficiency can be achieved because a strong control force can be generated with a small amount of electrical current.

It is also possible to estimate the position of the rotor by detecting a change in the flux in a space where the flux sensor is placed, and therefore, the size of the hybrid magnetic bearing can be reduced. Preferably, it is possible to provide the salient pole to the side of the rotor opposite the main pole and the commutating pole.

The other mode of the present invention is a hybrid magnetic bearing for a magnetically levitated pump having a rotor that rotates while being suspended without contact by controlling the magnetic force of a plurality of electromagnets and permanent magnets, whereby each electromagnet has a main pole and a commutating pole having a commutating pole permanent magnet provided approximately parallel to each other at predetermined intervals in a protruding condition radially to the rotor, and has a control coil wound around a core (magnetic core) having a main pole and a commutating pole; two of the electromagnets are arranged oppositely to each other across the rotor in an approximately horizontal position; the rotor is arranged so as to have a predetermined gap with the main pole and the commutating pole; and the permanent magnet is provided between the adjacent electromagnets.

According to the present invention, higher stiffness, higher efficiency, and further reduction in size can be realized by controlling the bias flux density by the control flux.

BRIEF DESCRIPTION OF THE DRAWINGS

FIG. 1(a) is a diagram viewed from the viewpoint of a commutating pole, FIG. 1(b) is a side view viewed from the viewpoint of a control coil 4c, FIG. 1(c) is a side view viewed from the viewpoint of a control coil 4b, and FIG. 1(d) is a diagram viewed from the main pole.

FIGS. 4(a) and 4(b) are diagrams showing passive stability in the axial direction and the tilting of Embodiment 1.

FIG. 5 is a diagram showing a control block of Embodiment 1.

FIG. 6 is a diagram showing a control block of Embodiment 1.

FIG. 8 is a diagram showing the configuration of Embodiment 2.

FIG. 9(a) is a diagram viewed from the top. FIG. 9(b) is a side view viewed from the viewpoint of a control coil 82c. FIG. 9(c) is a side view from the viewpoint of a control coil 82b. FIG. 9(d) is a diagram viewed from the bottom.

FIG. 12 is a diagram showing passive stability in the radial direction of Embodiment 2.

FIGS. 13(a) and 13(b) are diagrams showing the position of the permanent magnet of Embodiment 3.

BEST MODE FOR CARRYING OUT THE INVENTION

In the following description, details of the embodiments of the present invention are set forth on the basis of the drawings.

Embodiment 1

Figure 1:
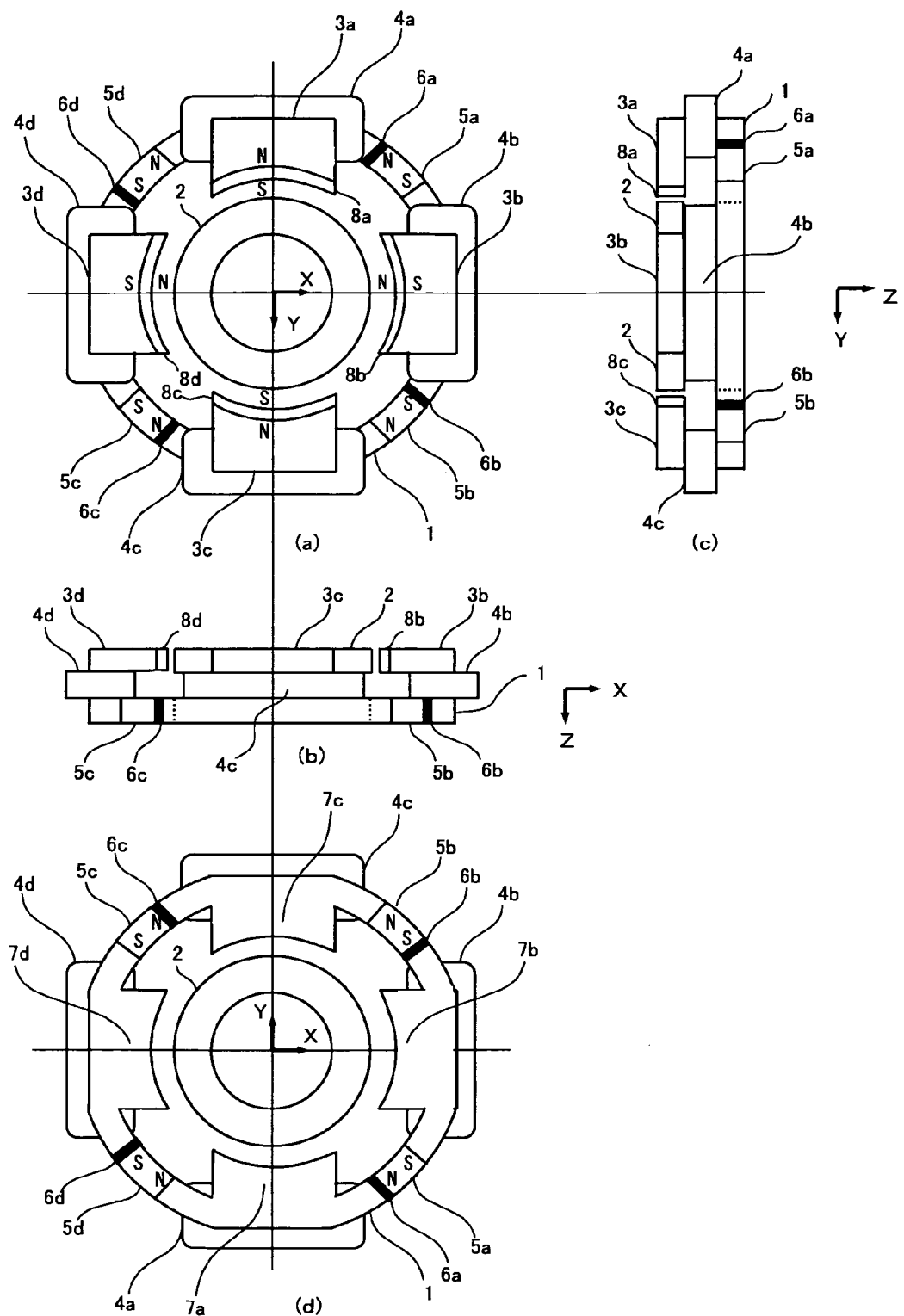
FIG. 1 is a developmental view of Embodiment 1.

FIG. 1 shows a development view of the hybrid magnetic bearing of the present invention. FIG. 1(a) is a diagram viewed from commutating poles 3a-3d. FIG. 1(b) is a side view viewed from commutating pole 3c. FIG. 1(c) is a side view viewed from commutating pole 3b. FIG. 1(d) is a diagram viewed from main poles 7a-7d.

The hybrid magnetic bearing shown in FIG. 1(a)-(d) consists of a stator 1 and a rotor 2. The stator 1 has a first commutating pole 3a, a second commutating pole 3b, a third commutating pole 3c, and a fourth commutating pole 3d which are provided in a protruding condition to the rotor 2; a first control coil 4a, a second control coil 4b, a third control coil 4c, and a fourth control coil 4d; a first permanent magnet 5a, a second permanent magnet 5b, a third permanent magnet 5c, and a fourth permanent magnet 5d; a first sensor 6a, a second sensor 6b, a third sensor 6c, and a fourth sensor 6d; a first main pole 7a, a second main pole 7b, a third main pole 7c, and a fourth main pole 7d, which are provided in a protruding condition to the rotor 2; and a first commutating pole permanent magnet 8a, a second commutating pole permanent magnet 8b, a third commutating pole permanent magnet 8c, and a fourth commutating pole permanent magnet 8d.

Each of the commutating poles 3a-3d possesses the commutating pole permanent magnets 8a-8d. The first commutating pole 3a has the first commutating pole permanent magnet 8a, the second commutating pole 3b has the second commutating pole permanent magnet 8b, the third commutating pole 3c has the third commutating pole permanent magnet 8c, and the fourth commutating pole 3d has the fourth commutating pole permanent magnet 8d.

The control coils 4a-4d are wound between the commutating poles 3a-3d and the main poles 7a-7d are opposite to the commutating poles in an approximately parallel orientation. The first control coil 4a is provided between the first commutating pole 3a and the first main pole 7a, the second control coil 4b is provided between the second commutating pole 3b and the second main pole 7b, the third control coil 4c is provided between the third commutating pole 3c and the third main pole 7c, and the fourth control coil 4d is provided between the fourth commutating pole 3d and the fourth main pole 7d. Note that the places for winding the coils are not limited to the places described above.

Permanent magnets 5a-5d are provided between the first through fourth main poles 7a-7d constituting the stator 1, and are fixed by a core unit extended from both ends of the main poles 7a-7d. The first permanent magnet 5a is provided between the main pole 7a and the main pole 7b, the second permanent magnet 5b is provided between the main pole 7b and the main pole 7c, the third permanent magnet 5c is provided between the main pole 7c and the main pole 7d, and the fourth permanent magnet 5d is provided between the main pole 7d and the main pole 7a.

Here, for materials of the first-fourth permanent magnets 5a-5d and the commutating pole permanent magnets 8a-8d explained above, a rare-earth magnet such as neodymium-iron-boron, samarium-cobalt, or samarium-iron-nitrogen is used. For the materials of the stator 1 and the rotor 2, a soft magnetic material such as magnetic soft iron, magnetic stainless-steel, or powder magnetic core is used. Note that the materials are not limited to the ones described above.

Figure 2:
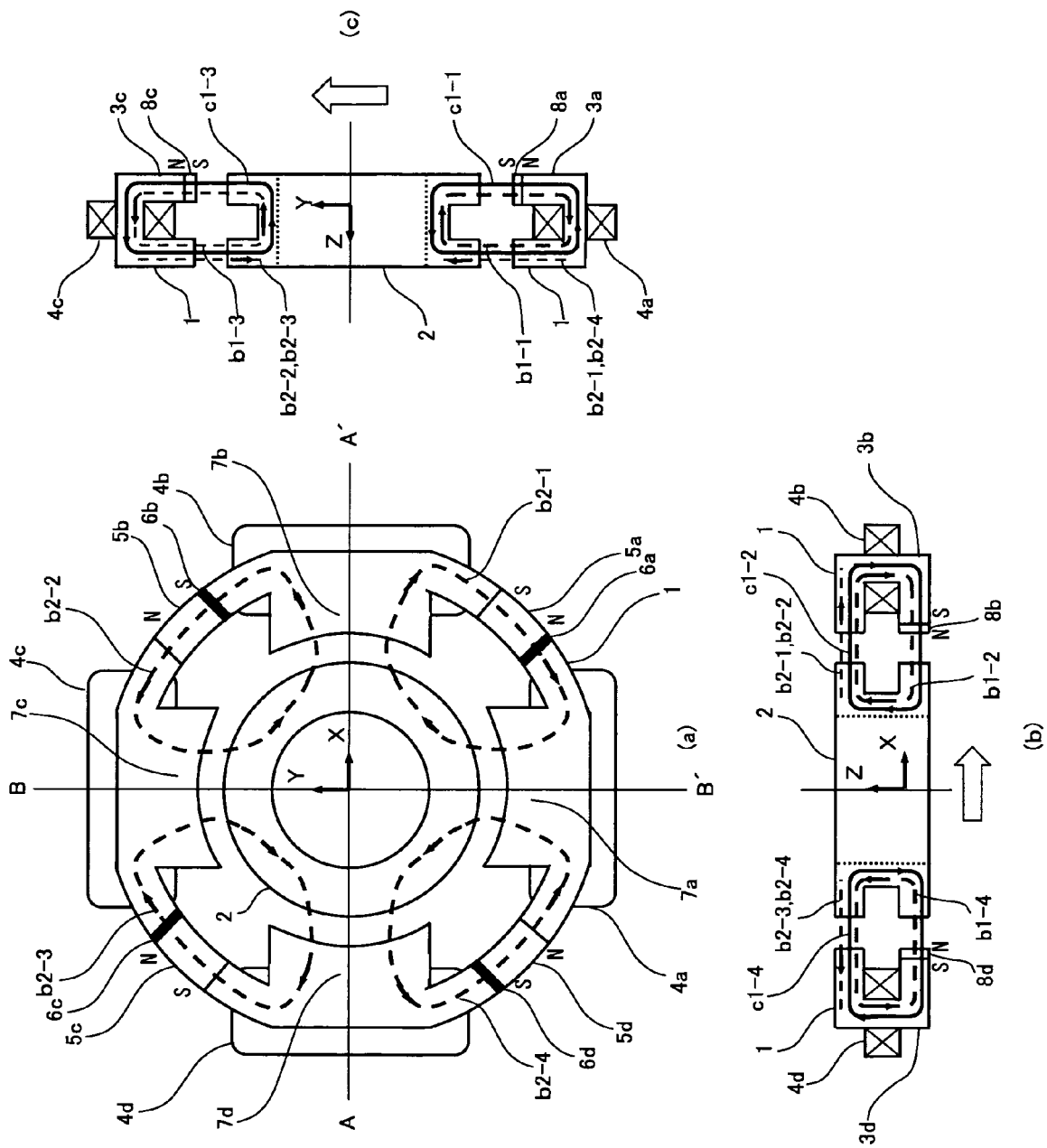
FIG. 2(a) is a diagram viewed from the main pole of Embodiment 1.
FIG. 2(b) is a cross-sectional view crossed at line A-A'.
FIG. 2(c) is a cross-sectional view crossed at line B-B'.

FIGS. 2(a)-2(c) are diagrams showing a flux generated in the hybrid magnetic bearing 1 of the present invention. As shown in FIGS. 2(b) and 2(c), the first through fourth commutating pole permanent magnets 8a-8d at the ends of the first through fourth commutating poles 3a-3d provide first bias fluxes b1-1 through b1-4 to a plurality of electromagnets. The first through fourth permanent magnets 5a-5d provide second bias fluxes b2-1 through b2-4 to the first through fourth main poles 7a-7d constituting the electromagnets.

Assume that the ends of the first commutating pole 3a and the third commutating pole 3c shown in FIG. 2(c) are a first polarity (a negative pole). The ends of the second commutating pole 3b and the fourth commutating pole 3d shown in FIG. 2(b) are a second polarity (a positive pole). The first permanent magnet 5a between a core consisting of the main pole 7a and the commutating pole 3a and a core consisting of the main pole 7b and the commutating pole 3b has the first polarity (a negative pole) arranged so as to be oriented toward the core consisting of the main pole 7b and the commutating pole 3b and the second polarity (a positive pole) arranged so as to be oriented toward the core consisting of the main pole 7a and the commutating pole 3a. Similarly, the second permanent magnet 5b between a core consisting of the main pole 7b and the commutating pole 3b and a core consisting of the main pole 7c and the commutating pole 3c has the first polarity (a negative pole) arranged so as to be oriented toward the core consisting of the main pole 7b and the commutating pole 3b and the second polarity (a positive pole) arranged so as to be oriented toward the core consisting of the main pole 7c and the commutating pole 3c. The third permanent magnet 5c between a core consisting of the main pole 7c and the commutating pole 3c and a core consisting of the main pole 7d and the commutating pole 3d has the first polarity (a negative pole) arranged so as to be oriented toward the core consisting of the main pole 7d and the commutating pole 3d and the second polarity (a positive pole) arranged so as to be oriented toward the core consisting of the main pole 7c and the commutating pole 3c. The forth permanent magnet 5d between a core consisting of the main pole 7d and the commutating pole 3d and a core consisting of the main pole 7a and the commutating pole 3a has the first polarity (a negative pole) arranged so as to be oriented toward the core consisting of the main pole 7d and the commutating pole 3d and the second polarity (a positive pole) arranged so as to be oriented toward the core consisting of the main pole 7a and the commutating pole 3a. By winding control coils 4a-4d (magnetizing coils) around each of the cores consisting of the main poles 7a-7d and the commutating poles 3a-3d being paired respectively, control fluxes c1-1 through c1-4 are controlled and the magnetic force in the radial direction is controlled.

The first bias fluxes b1-1 through b1-4 generated by the control fluxed c1-1 through c1-4 and the commutating pole permanent magnets 8a-8d travel through a flux path consisting of the main poles 7a-7d, the commutating poles 3a-3d and the rotor 2. Here, a gap in the commutating pole end (between the commutating pole and the rotor), because the gap has the commutating pole permanent magnets 8a-8d, is longer compared with a gap in the main pole end (between the main pole and the rotor). For that reason, the second bias fluxes b2-a through b2-4 travel through a flux path consisting of the adjacent main poles 7a-7d and the rotor 2. As a result, in the commutating poles 3a-3d, controlling force can be enhanced by the first bias fluxes b1-1 through b1-4 generated by the commutating pole permanent magnets 8a-8d.

In the main poles 7a-7d, in addition, the controlling force can be further enhanced by the first bias fluxes b1-1 through b1-4 generated by the commutating pole permanent magnets 8a-8d and the second bias fluxes c1-1 through c1-4 generated by the permanent magnets 5a-5d. According to the above configuration, it is possible to generate a strong controlling force from a small amount of current, and therefore, efficiency can be improved.

Figure 3:
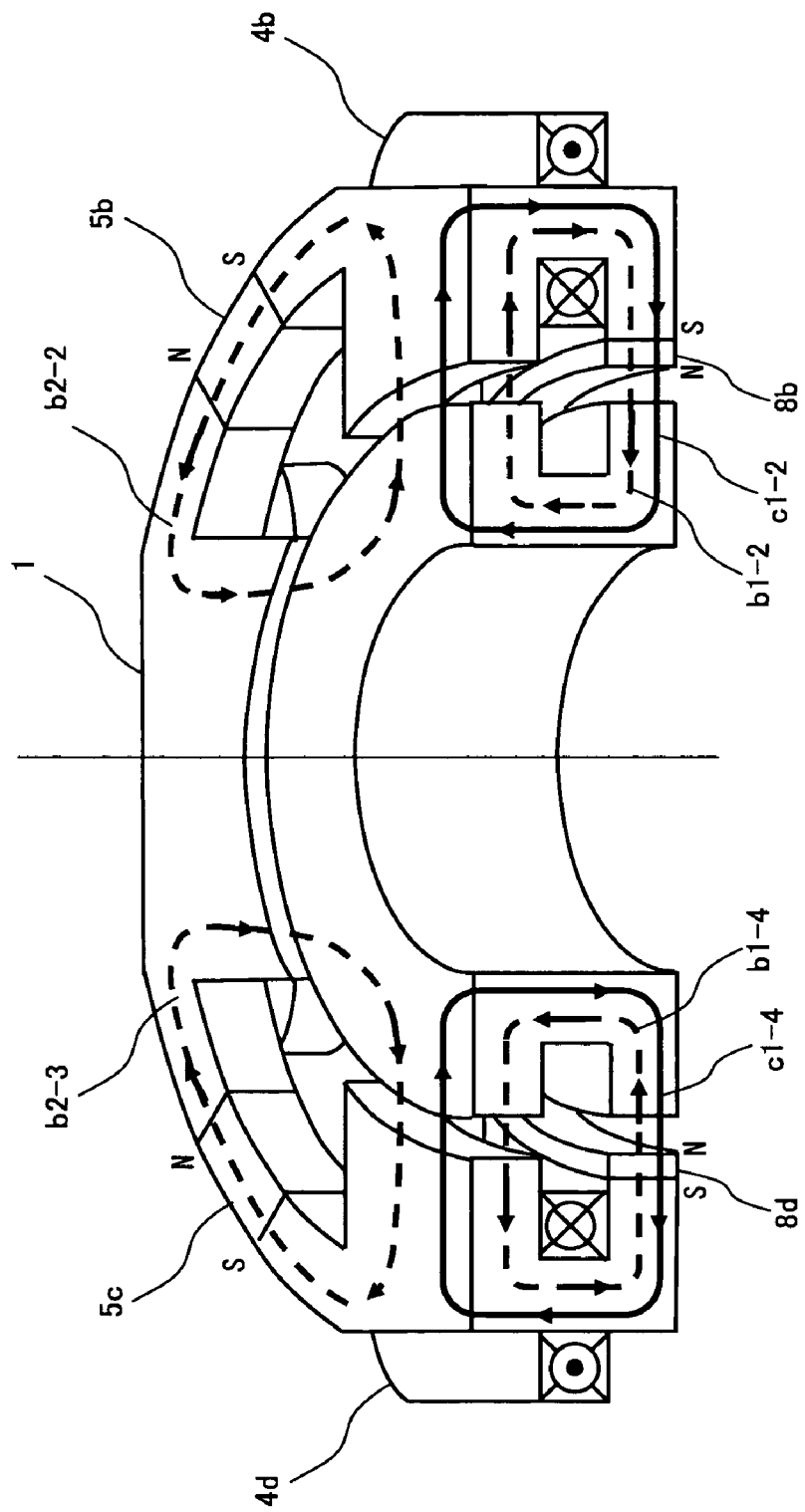
FIG. 3 is a diagram showing flux lines on the cross-sectional perspective view crossed at a line A-A' of FIG. 2.

A control method is explained using the cross-sectional perspective view of the magnetic bearing in FIGS. 2(a), 2(b), 2(c), and 3. FIG. 2(b) and FIG. 3 are, respectively, a cross-sectional view and a cross-section perspective view of FIG. 2(a) crossed at line A-A'. As shown in FIG. 2(b) and FIG. 3, the first bias fluxes b1-2 and b1-4 are generated by the commutating pole permanent magnets 8b and 8d. The second bias flux that is a combination of the second bias fluxes b2-1 and b2-2 and the second bias flux that is a combination of the second bias fluxes b2-3 and b2-4 are generated by the permanent magnets 5a-5d. Here, in this case, by supplying the control coils 4b and 4d with electrical current in the direction indicated in FIG. 3, the control fluxes c1-2 and c1-4 are generated. At that time, in a gap between the main pole 7d and the commutating pole 3d, the control flux c1-4 is generated in an opposite direction from the first bias flux b1-4 and the flux that is a combination of the second bias fluxes b2-3 and b2-4. As a result, fluxes cancel each other and the flux density is reduced.

On the other hand, in a gap between the main pole 7b and the commutating pole 3b, the control flux c1-2 is generated in the same direction as that of the first bias flux b1-2 and the flux that is a combination of second fluxes b2-1 and b2-2. As a result, the flux density is increased, and magnetic attraction toward a direction X (the direction indicated by the arrow in the figures) is generated.

In contrast, if the control flux in the direction opposite to the direction in FIG. 2(b) is generated by an electromagnet, magnetic attraction is generated in the direction opposite to the direction indicated by the arrow.

FIG. 2(c) is a cross-sectional view of FIG. 2(a) crossed at line B-B'. As shown in FIG. 2(c), the first bias fluxes b1-1 and b1-3 are generated by the commutating pole permanent magnets 8a and 8c. The second bias flux that is a combination of the second bias fluxes b2-1 and b2-4 and the second bias flux that is a combination of the second bias fluxes b2-2 and b2-3 are generated by the permanent magnets 5a-5d, additionally. Here, in this case, the control fluxes c1-1 and c1-3 are generated. At that time, in a gap between the main pole 7a and the commutating pole 3a, the control flux c1-1 is generated in the opposite direction to the direction of the first bias flux b1-1 and the flux that is a combination of the second bias fluxes b2-1 and b2-4. As a result, the fluxes cancel each other, and the flux density is reduced.

On the other hand, in a gap between the main pole 7c/the commutating pole 3c and the rotor 2, the control flux c1-3 is generated in the same direction as the first bias flux b1-3 and the flux that is a combination of the second bias fluxes b2-2 and b2-3. As a result, the flux density is increased, and magnetic attraction toward a direction Y (the direction indicated by the arrow) is generated. In contrast, if the control flux in a direction opposite to the direction in FIG. 2(b) is generated by an electromagnet, magnetic attraction is generated in the direction opposite to the direction indicated by the arrow.

Via the X direction control and the Y direction control described above, radial magnetic levitation can be realized.

Next, an explanation regarding the axial direction and the tilt is provided according to a cross-sectional overview in FIG. 4(a), (b) and FIG. 2(b). Via strong radial magnetic attraction caused by the commutating pole permanent magnets 8a-8d and the permanent magnets 5a-5d, passive magnetic support is performed. When the rotor 2 is displaced in the axial direction, as shown in FIG. 4(a), restoring force in a direction that restores the displacement is generated by the bias attraction of the commutating pole permanent magnets 8b and 8d and the permanent magnets 5a-5d, and the displacement is eliminated. When it is tilted, as shown in FIG. 4(b), a restoring torque in a direction opposite to the tilt is generated by the bias attraction of the commutating poles 8b and 8d and the permanent magnets 5a-5d, and the tilting is eliminated.

FIG. 5 and FIG. 6 show the control system of the present magnetic bearing. FIG. 5 shows a control system of the present magnetic bearing on the basis of a position detection method employing a flux sensor such as a hall element. The control coil of each of the electromagnets opposite to each other (each electromagnet consisting of a main pole and a commutating pole) is wired so as to generate the control flux in a different direction. Sensors 6a-6d are set up in areas between electromagnets other than the first through fourth permanent magnets 5a-5d (i.e., in the core of the stator 1). The sensors 6a-6d detect an amount of change in the bias flux of the permanent magnets 5a-5d caused by the displacement of the rotor 2, and estimate the displacement of the rotor 2 on the amount of change in the basis of the flux. Because a signal detected by the sensors 6a-6d is nonlinear, by taking a calculation (e.g. sum or difference) of a value of each sensor amplified by sensor amplifiers 1-4 indicated as sensor amplifiers 55-58, it is possible to obtain a linearity of position detection in the X and Y directions and to remove mutual interference between the X axis and Y axis.

In the present embodiment, signals obtained from the sensor 6a and the sensor 6c are amplified by the sensor amplifier 1_55 for a signal from the sensor 6a and by the sensor amplifier 3_56 for the signal from sensor 6c, and the output difference is calculated. Signals obtained from the sensor 6b and the sensor 6d are amplified by the sensor amplifier 2_57 for the signal from the sensor 6b and by the sensor amplifier 4_58 for the signal from the sensor 6d, and the output difference is calculated. Afterwards, using the above calculation results, the amount of change is calculated from the output of the displacement in the X direction by taking the difference and the output of the displacement in the Y direction by taking the sum. The amount of change is converted into digital signals by an A/D converter or the like (not shown in the drawing) and transferred to an X direction controller 51 and a Y direction controller 52. Control current values are calculated in the X direction controller 51 and the Y direction controller 52, and by applying the control current to each of the coils 4a-4d of the electromagnets of the magnetic bearing from power amplifiers 53 and 54, position control of the rotor 2 is performed. For the controller, employing PID control is one possibility.

Although the apparatus would be larger than the above control system, control of the present magnetic bearing is possible by employing a displacement sensor such as an eddy-current sensor. A control system when a displacement sensor such as an eddy-current sensor is used is shown in FIG. 6.

The coils 4a-4d of each of the electromagnets opposite to each other are wired so as to generate the control flux in a different direction. In order to detect the distance from a target (not shown in the drawing) placed on the rotor 2, sensors 61 and 62 are arranged in the radial directions (e.g. X and Y directions). The position of the rotor 2 is detected by the sensors 61 and 62 on the X and Y axes, the detected signal is amplified by sensor amplifiers 65 and 66, and the signal is transferred to an X direction controller 67 and a Y direction controller 68 from an A/D converter or the like (not shown in the drawing). Afterwards, the control current value is calculated by each of the controllers 67 and 68, and by applying the control current to each of the coils 4a-4d of the electromagnets of the magnetic bearing from power amplifiers 63 and 64, position control of the rotor 2 is performed. For the X direction controller 67 and the Y direction controller 68, employing PID control is one possibility.

Figure 7:
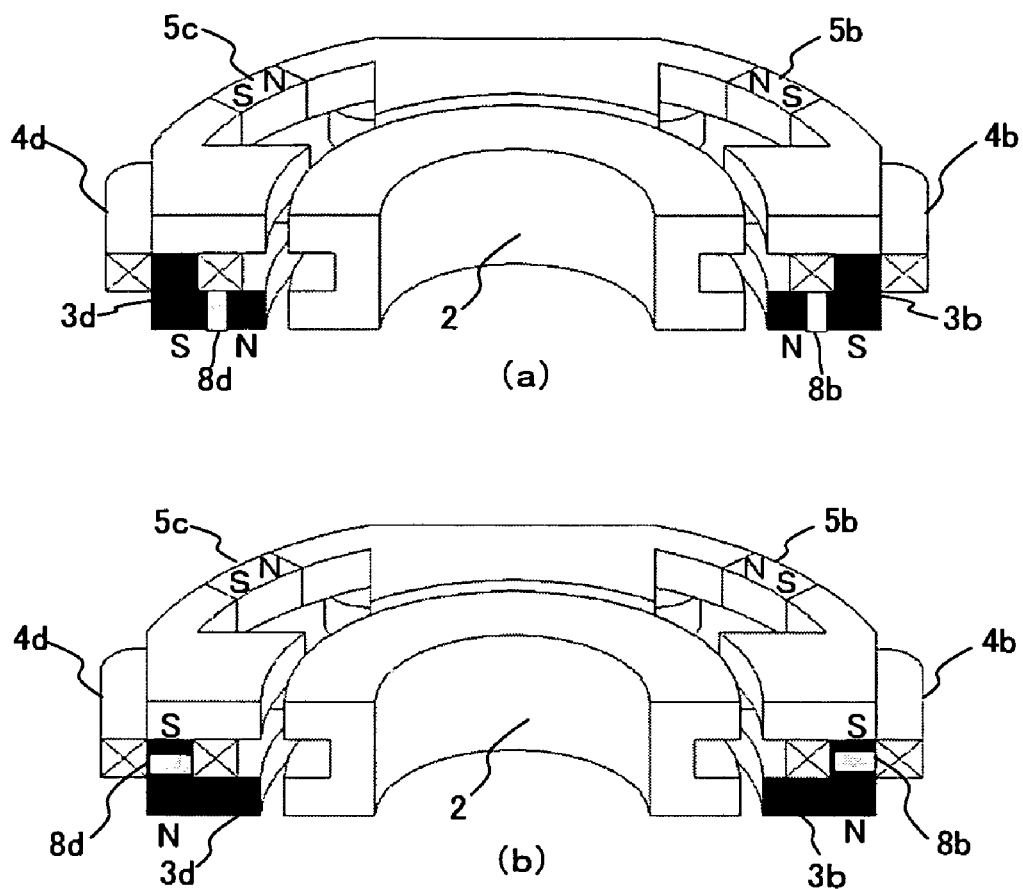
FIGS. 7(a) and 7(b) are diagrams showing the positions of the permanent magnet of Embodiment 1.

It should be noted that in a configuration such that the commutating permanent magnets 8a-8d are arranged in the middle of the salient pole for each commutating pole as described in FIGS. 7(a) and 7(b), each of the bias fluxes and control fluxes form the same magnetic paths as those explained above, and therefore a control that is the same as that of Embodiment 1 is possible.

In Embodiment 1, even though four electromagnets, which are paired so that each commutating pole is matched with a main pole, are provided, the number of electromagnets is not limited to four in particular, and any plural number of electromagnets can be provided. According to the above configuration, it is possible to increase the bias flux without increasing the thickness of the commutating pole permanent magnet, to enhance the control efficiency, and to improve the estimated accuracy of the position control of the rotor.

Embodiment 2

FIG. 8 explains a case of a control in which main poles 71b, 71d, 71f, and 71h, and commutating poles 71a, 71c, 71e, and 71g are arranged on the same plane, and control fluxes are generated in control coils 72a-72d. FIG. 8 explains only a case of the control in the X direction for convenience. A bias flux b75a shown in FIG. 8 forms a magnetic path traveling from the positive pole of a commutating pole permanent magnet 74d at the end of the commutating pole 71a to the main pole 71b via a rotor 75. A bias flux b75b forms a magnetic path traveling from the positive pole of a commutating pole permanent magnet 74a at the end of the commutating pole 71c to the core, to the main pole 71d and to the rotor 75. The bias flux b75c forms a magnetic path traveling from the positive pole of a commutating pole permanent magnet 74b at the end of the commutating pole 71e to the main pole 71f via a rotor 75. A bias flux b75d forms a magnetic path traveling from the positive pole of a commutating pole permanent magnet 74c at the end of the commutating pole 71g to the core, to the main pole 71h and to the rotor 75.

As shown in FIG. 8, a bias flux b76a forms a magnetic path traveling from the positive pole of the permanent magnet 73a between the main pole 71b and the commutating pole 71c to the main pole 71b, via the main pole 71d and the rotor 75. A bias flux b76b forms a magnetic path traveling from the positive pole of the permanent magnet 73b between the main pole 71d and the commutating pole 71e to the main pole 71f, via the main pole 71d and the rotor 75. A bias flux b76c forms a magnetic path traveling from the positive pole of the permanent magnet 73c between the main pole 71f and the commutating pole 71g to the main pole 71f, via the main pole 71h and the rotor 75. A bias flux b76d forms a magnetic path traveling from the positive pole of the permanent magnet 73d between the main pole 71h and the commutating pole 71a to the main pole 71b, via the main pole 71h and the rotor 75.

The control flux c77b is generated by the control coil 72b, and forms a magnetic path traveling through the commutating pole 71c, the main pole 71d, and the rotor 75. The control flux c77d is generated by the control coil 72d and forms a magnetic path traveling through the commutating pole 71g, the main pole 71h, and the rotor 75. Here, although the explanation in FIG. 8 considers only a case of the control in the X direction for convenience, control fluxes are actually generated by the control coils 72a and 72c in the same manner. In a case of the control in the Y direction, the control is performed by using the control coils 72a and 72c.

In a case of shifting the rotor 75 in the X direction (the direction indicated by the arrow in FIG. 8), fluxes are detected by flux sensors or displacement is detected by a displacement sensor, and density of the control fluxes is changed by controlling the current in the control coils 72a-72d, as explained in the above embodiment. In the present embodiments, bias fluxes b75b, b76a, and b76b are generated in the same direction in the main pole 71d of the control coil 72b side and a control flux c77b is generated in the same direction as the direction of the bias fluxes. In the commutating pole 71c, the control flux c77b is also generated in the same direction as the direction of the bias flux b75b.

On the other hand, in the main pole 71f of the control coil 72d side, bias fluxes b75d, b76c, and b76d are generated in the same direction and a control flux c77d is generated in the direction opposite to the direction of the bias fluxes. In the commutating pole 71g, a control flux c77d is generated in the direction opposite to the direction of the bias flux b75d. By such fluxes, attraction in the control coil 72b end of the rotor 75 is enhanced, whereas attraction is reduced in the control coil 72d end, and as a result, the rotor 75 is shifted to the X direction (the direction indicated by the arrow in FIG. 8).

According to the above configuration, it is possible to control the position of the rotor 75 in both the X direction and the Y direction. In addition, even if the commutating pole permanent magnets 74a-74d are arranged in the middle of the salient pole of the commutating poles 71a, 71c, 71e, and 71g, each of the bias fluxes and control fluxes travels in the same magnetic paths as those in Embodiment 2, and therefore the same control as that in Embodiment 2 can be performed.

Although four electromagnets, each of which consists of a commutating pole and a main pole, are provided in Embodiment 2, the number of permanent magnets is not limited to four, but plural numbers of permanent magnet can be provided.

According to the above configuration, it is possible to increase the bias fluxes without increasing the thickness of the commutating pole permanent magnet, to enhance the control efficiency, and to improve the estimated accuracy of the position control of the rotor.

Embodiment 3

Figure 9:
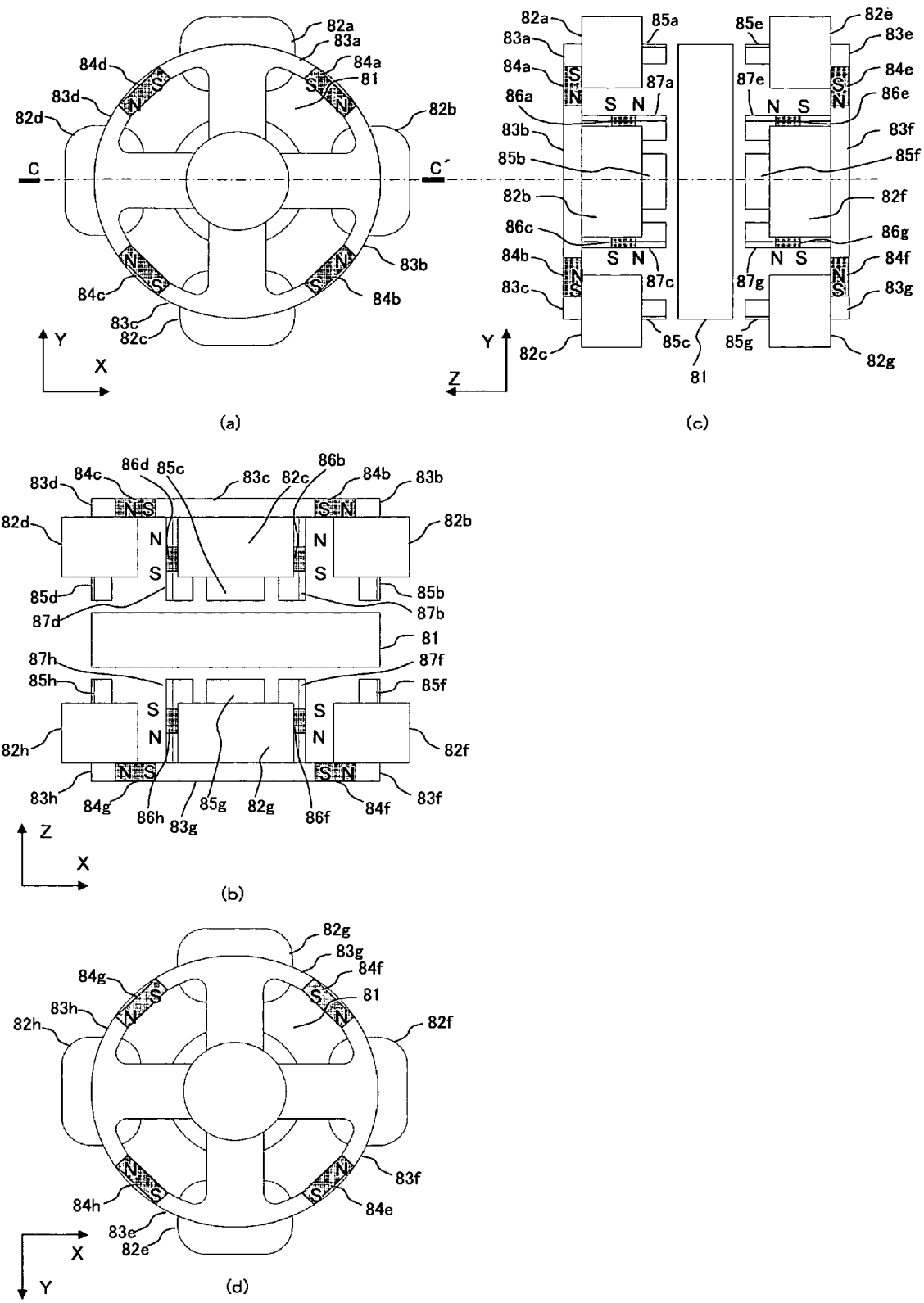
FIG. 9 is a development view of Embodiment 3.

FIG. 9 is a development view of the configuration of Embodiment 3. FIG. 9(a) is a top view. FIG. 9(b) is a side view viewed from the control coils 82c and 82g end. FIG. 9(c) is a side view viewed from the commutating poles 82d and 82f end. FIG. 9(d) is a bottom view.

The hybrid magnetic bearing of the present invention shown in FIGS. 9(a)-9(d) has a configuration having a magnetic bearing that controls a rotor 81 upward and downward of the rotor 81.

The upper magnetic bearing has control coils 82a-82d, first through fourth cores 83a-83d, and first through fourth permanent magnets 84a-84d. The first through fourth cores 83a-83d have the first through fourth main poles 85a-85d and the first through fourth commutating poles 87a-87d projecting toward the rotor 81, and each of the main poles 85a-85d opposite to each of the commutating poles 87a-87d, respectively. Here, it is desirable that the first through fourth main poles 85a-85d and the first through fourth commutating poles 87a-87d project approximately perpendicular from the upper plane or the lower plane of the core toward the rotor 81 (plane).

Next, the first core 83a has a first control coil 82a on the first main pole 85a, the second core 83b has a second control coil 82b on the second main pole 85b, the third core 83c has a third control coil 82c on the third main pole 85c, and the fourth core 83d has a fourth control coil 82d on the fourth main pole 85d.

Each of the above commutating poles 87a-87d possesses the commutating pole permanent magnets 86a-86d. The first commutating pole 87a has the first commutating pole permanent magnet 86a, the second commutating pole 87b has the second commutating pole permanent magnet 86b, the third commutating pole 87c has the third commutating pole permanent magnet 86c, and the fourth commutating pole 87d has the fourth commutating pole permanent magnet 86d.

The first through fourth permanent magnets 84a-84d are provided between the first through fourth cores 83a-83d, and are fixed by parts extended from both ends of the first through fourth cores 83a-83d. The first permanent magnet 84a is provided between the first core 83a and the second core 83b, the second permanent magnet 84b is provided between the second core 83b and the third core 83c, the third permanent magnet 84c is provided between the third core 83c and the fourth core 83d, and the fourth permanent magnet 84d is provided between the fourth core 83d and the first core 83a.

The lower magnetic bearing has control coils 82e-82h, fifth through eighth core 83e-83h, and fifth through eighth permanent magnets 84e-84h. The fifth through eighth cores 83e-83h have the fifth through eighth main poles 85e-85h and the fifth through eighth commutating poles 87e-87h projecting toward the rotor 81, and each of the main poles 85e-85h opposite to each of the commutating poles 87e-87h, respectively. Here, it is desirable that the fifth through eighth main poles 85e-85h and the fifth through eighth commutating poles 87e-87h project approximately perpendicular from the upper plane or the lower plane of the core toward the rotor 81 (plane).

Next, the fifth core 83e has a fifth control coil 82e on the fifth main pole 85e, the sixth core 83f has a sixth control coil 82f on the sixth main pole 85f, the seventh core 83g has a seventh control coil 82g on the seventh main pole 85g, and the eighth core 83h has a eighth control coil 82h on the eighth main pole 85h.

Each of the above commutating poles 87e-87h possesses commutating pole permanent magnets 86a-86d. The fifth commutating pole 87e has the fifth commutating pole permanent magnet 86e, the sixth commutating pole 87f has the sixth commutating pole permanent magnet 86f, the seventh commutating pole 87g has the seventh commutating pole permanent magnet 86g, and the eighth commutating pole 87h has the eighth commutating pole permanent magnet 86h.

The fifth through eighth permanent magnets 84e-84h are provided between the fifth through eighth cores 83e-83h, and are fixed by parts extended from both ends of the fifth through eighth cores 83e-83h. The fifth permanent magnet 84e is provided between the fifth core 83e and the sixth core 83f, the sixth permanent magnet 84f is provided between the sixth core 83f and the seventh core 83g, the seventh permanent magnet 84g is provided between the seventh core 83g and the eighth core 83h, and the eighth permanent magnet 84h is provided between the eighth core 83h and the fifth core 83e.

For the material of the permanent magnets 84a-84h and commutating pole permanent magnet 86a-86h, (rare-earth magnets) such as neodymium-iron-boron, samarium-cobalt, and samarium-iron-nitrogen are used. For the material of the upper and lower magnetic bearings and the rotor 81, (soft iron materials) such as magnetic soft iron, magnetic stainless steel, and powder magnetic core are used. Note that the materials are not limited to those explained above.

The control of the magnetic bearing explained in FIG. 9 above is explained with reference to FIGS. 10(a), 10(b) and 11. FIGS. 10(a), 10(b) and 11 are diagrams showing directions of the control fluxes when a control force is to be generated in a positive direction of Z axis. FIG. 10(a) is a cross-sectional view crossed at the line C and C'. FIG. 10(b) and FIG. 9(b) are side views from the third core 83c end. FIG. 11 is a cross-sectional perspective view of FIG. 10(a). Here, FIG. 11 describes a cross section of the magnetic bearing in which parts such as the main pole 85a, commutating pole 87a, and the control coil 82a in the positive direction of the Y axis that bias fluxes b810a and b810d of the first permanent magnet 84a and the fourth permanent magnet 84d travel are omitted for convenience. In addition, FIGS. 10(a), 10(b) and 11, regarding flux lines, are diagrams of flux lines in which parts other than the parts described later are not shown, for convenience. In fact, as long as the configuration is the same as the one described later, the fluxes can be controlled in the same manner even in a place other than that of the configuration described later by generating the first bias flux generated by the commutating pole permanent magnet and the second bias flux generated by the permanent magnet and changing the density of the control flux by using the control coil.

In the present embodiment, regarding the control flux (control flux generation direction when control force is generated in the positive direction of the Z axis), the first through eighth control fluxes are generated from the coil, and this forms a magnetic path of main pole—rotor—commutating pole. The bias flux (the first bias flux) generated by the first through eighth commutating pole permanent magnets 86a-86h forms a magnetic path of main pole—rotor—commutating pole. The bias flux (the second bias flux) generated from the second permanent magnets 84a-84h forms a magnetic path of a main pole in the positive pole end—rotor—main pole in the negative pole end.

The control flux c88b traveling in the space between the magnetic bearing arranged in the upper positive direction of the Z axis and the rotor 81 as shown in FIG. 10(a) controls the flux density with the control coil 82b.

Here, the rotor 81 has a configuration having H-shaped grooves 81a and 81b as shown in FIG. 10(a). It is desirable that the width of the groove be the same as, for example, the space between the opposing main pole and commutating pole.

The bias flux b89b is generated by the second commutating pole permanent magnet 86b. As a result, because the first bias flux b89b is a flux in the same direction with respect to the control flux c88b, the fluxes can be enhanced by each other. In addition, the second bias fluxes b810a and b810b are generated from the first permanent magnet 84a and the second permanent magnet 84*b*, respectively, and are generated in the direction of enhancing the control flux c88*b*. The control flux c88*d* controls the magnetic density by the control coil 82*d*. The first bias flux b89*d* is generated by the fourth commutating pole permanent magnet 86*d*. As a result, because the first bias flux b89*d* is a flux in the same direction as the control flux c88*d*, the fluxes can be enhanced by each other. In addition, the second bias fluxes b810*d* and b810*c* are generated from the fourth permanent magnet 84*d* and the third permanent magnet 84*c*, respectively, and are generated in the direction of enhancing the control flux c88*b*.

Although it is not shown in the drawing, the flux density is controlled by the control flux c88*a* generated by the control coil 82*a*. The first bias flux b89*a* is generated by the first commutating pole permanent magnet 86*a*. As a result, because the first bias flux b89*a* is a flux in the same direction with respect to the control flux c88*a*, the fluxes can be enhanced with each other. In addition, the second bias fluxes b810*a* and b810*d* are generated from the first permanent magnet 84*a* and the fourth permanent magnet 84*d*, respectively, and are generated in the direction of enhancing the control flux c88*a*. The control flux c88*c* is generated by the control coil 82*c* and controls the flux density. The first bias flux b89*c* is generated by the third commutating pole permanent magnet 86*c*. As a result, because the first bias flux b89*c* is a flux in the same direction as the control flux c88*c*, the fluxes can be enhanced by each other. In addition, the second bias fluxes b810*b* and b810*c* are generated from the second permanent magnet 84*b* and the third permanent magnet 84*c*, respectively, and are generated in the direction of enhancing the control flux c88*c*.

Figure 10:
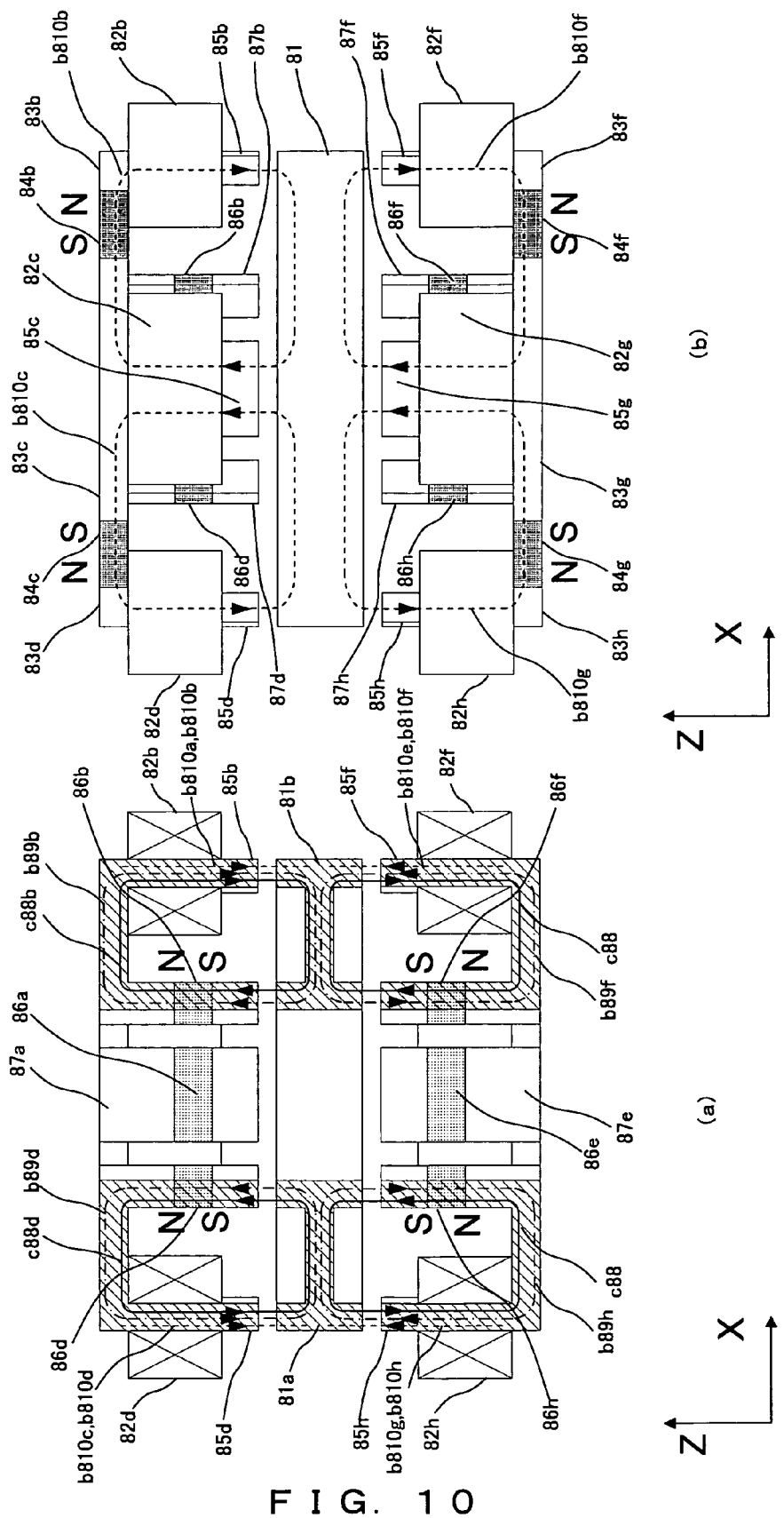
FIG. 10(a) is a diagram showing flux lines on the cross-sectional view crossed at line C-C'.
FIG. 10(b) is a diagram showing flux lines on the side view from the viewpoint of a control coil 82c.
Figure 11:
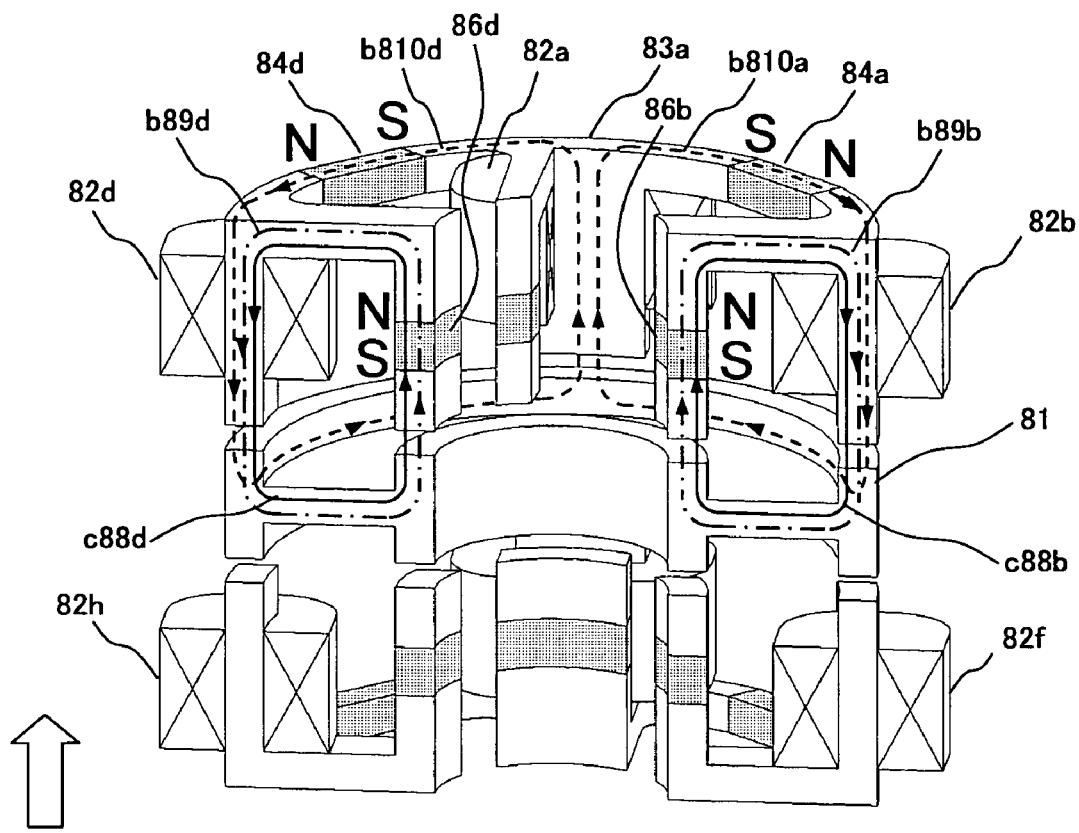
FIG. 11 is a diagram showing flux lines on a cross-sectional perspective view crossed at line C-C' of FIG. 2.

The control flux traveling in a space between the magnetic bearing arranged in the bottom located in the negative direction of the Z axis and the rotor 81 shown in FIG. 10(*a*) is generated in a direction attenuating the fluxes with respect to the bias flux. The control flux c88*f* controls the flux density by the control coil 82*f*. The first bias flux b89*f* is generated by the sixth commutating pole permanent magnet 86*f*. As a result, because the flux of the first bias flux b89*f* is generated in the opposite direction with respect to the control flux c88*f*, the fluxes can attenuate each other. In addition, the second bias fluxes b810*e* and b810*f* are generated by the fifth permanent magnet 84*e* and the sixth permanent magnet 84*f*, respectively, and are generated in a direction attenuating the control flux c88*f*. The control flux c88*h* control the flux density by the control coil 82*h*. The first bias flux b89*h* is generated by the eighth commutating pole permanent magnet 86*h*. As a result, because the flux of the first bias flux b89*h* is generated in the opposite direction with respect to the control flux c88*h*, the fluxes can attenuate each other. In addition, the second bias fluxes b810*g* and b810*h* are generated by the eighth permanent magnet 84*h* and the seventh permanent magnet 84*g*, respectively, and are generated in a direction attenuating the control flux c88*h*.

Although it is not shown in the drawing, the control flux c88*e* is generated by the control coil 82*e*, and controls the flux density. The first bias flux b89*e* is generated by the fifth commutating pole permanent magnet 86*e*. As a result, because the flux of the first bias flux b89*e* is generated in the opposite direction with respect to the control flux c88*e*, the fluxes can attenuate each other. In addition, the second bias fluxes b810*e* and b810*h* are generated by the fifth permanent magnet 84*e* and the eighth permanent magnet 84*h*, respectively, and are generated in a direction attenuating the control flux c88*e*. The control flux c88*g* control the flux density by the control coil 82*g*. The first bias flux b89*g* is generated by the seventh commutating pole permanent magnet 86*g*. As a result, because the flux of the first bias flux b89*g* is generated in the opposite direction with respect to the control flux c88*g*, the fluxes can attenuate each other. In addition, the second bias fluxes b810*g* and b810*f* are generated by the seventh permanent magnet 84*g* and the sixth permanent magnet 84*f*, respectively, and are generated in a direction attenuating the control flux c88*g*. In such a manner, a control in the positive direction of the Z axis can be realized.

In contrast, when each of the control fluxes are generated in the direction opposite to the directions described in FIG. 10(*a*), a control in the negative direction of the Z axis can be realized. A control flux is generated from a control coil and forms a magnetic path traveling through a main pole, a rotor, and a commutating pole. A bias flux (the first bias flux) of a commutating pole permanent magnet is generated by the commutating pole permanent magnet, and forms a magnetic path traveling through a main pole, a rotor, and a commutating pole. A bias flux (the second bias flux) of a permanent magnet is generated by the permanent magnet, and forms a magnetic path traveling through a main pole in the positive pole end, a rotor, and a main pole in the negative pole end.

The control flux traveling in a space between the electromagnet in the 81*a* end of the magnetic bearing located in the positive direction of the Z axis and the rotor 81 as shown in FIG. 10(*a*) is generated in a direction enhancing the bias flux, and the control flux traveling in a space between the electromagnet in the 81*b* end and the rotor 81 is generated in a direction attenuating the bias flux. In addition, by generating the control flux traveling in a space between the electromagnet in the 81*a* end of the magnetic bearing located in the negative direction of the Z axis and the rotor 81 in the direction attenuating the bias flux, and by generating the control flux traveling in a space between the electromagnet in the 81*b* end and the rotor 81 in the direction enhancing the bias flux, it is possible to generate a tilting torque in the counterclockwise direction around the Y axis (clockwise direction in FIG. 10(*a*)). In the opposite manner, if each of the control fluxes are generated in the direction opposite to the direction explained above, it is possible to generate a tilting torque in the clockwise direction around the Y axis (counterclockwise direction in FIG. 10(*a*)). In the same manner, a tilting torque around the X axis can be generated. As described above, controls in the Z axis direction, around the X axis, and around the Y axis can be performed. As for the radial direction, by strong magnetic attraction in the axial direction by a permanent magnet, passive magnetic suspensin is realized. When the rotor is displaced in the radial direction, a restoring force is generated in a direction that will restore the displacement by attraction of the permanent magnet, and the displacement can be eliminated.

According to the above configuration, axial direction control and tilt control can be realized by connecting the control coil of electromagnets oriented toward each other on the top and bottom magnetic bearings, and by adjusting the flux density in the space to be high in one end and low in the other.

It should be noted that although the explanation is omitted here, the control coils 82*a*-82*h* can be controlled as described in Embodiment 1.

In addition, by utilizing the weight of the rotor and unequal force of the permanent magnets etc., a control of magnetic levitation is possible as a one-sided magnetic bearing.

It is also possible to have a magnetic levitation motor by utilizing only one side of Embodiment 3 and making another side be a motor. The motor side can have direct driving with a stator being arranged or magnet coupling driving.

It should be noted that the arrangement of the first through eighth commutating pole permanent magnets 86*a*-86*h* shown in FIGS. 13(a) and (b) is not limited to the end of the salient pole, but the magnets can be arranged within a range from the end of the commutating pole of the core to the part where the coil is wound.

According to the above configuration, it is possible to increase the bias fluxes without increasing the thickness of the commutating pole permanent magnet, to enhance the control efficiency, and to improve the estimate accuracy of the position control of the rotor.

Embodiment 4

A pump to which the magnetic bearings of Embodiments 1-3 explained above are applied is set forth. A centrifugal pump having an impeller formed on the top of the rotor and topped with a pump head unit having inlet/outlet, a permanent magnet placed on the opposite plane or inner plane of the rotor, and driven by a magnet drive by the permanent magnet placed on the axis of the motor outside of the pump casing is explained.

(Magnetic Levitation Pump)

A configuration of the magnetic bearing in the radial direction is explained (utilizing Embodiments 1 and 2). For example, an impeller can be formed on the top of the rotor 2. A permanent magnet with 2×N poles is placed on the inner surface or the bottom of the rotor 2. The rotor-impeller constructed as described above is encased in a pump casing. The magnetic bearing 1 and a driving electromagnet having the same number of poles as that of the driving permanent magnet placed on the rotor 2 or a magnet coupling having the same number of poles as that of the driving permanent magnet placed on the rotor 2 are placed outside of the casing and magnetic levitation rotation is realized.

Next, a configuration of the magnetic bearing in the axial direction is explained (utilizing Embodiment 3). For example, using only one side of the magnetic bearing (the magnetic bearing in the positive direction or the magnetic bearing in the negative direction in the axial direction) a driving electromagnet can be placed in the opposite side of the bearing, and direct-drive driving is realized by generating a rotating magnetic field. Alternatively, by placing a motor with a magnet coupling and by rotating the magnet coupling, the rotor 81 is driven. In the motor end of the rotor 81, a yoke having a driving permanent magnet is placed. An impeller is formed between the yoke of the magnetic bearing end of the rotor 81 and the yoke of the driving permanent magnet. The rotor 81 impeller constructed as described above is encased in a pump casing. The magnetic bearing, and a driving electromagnet having the same number of poles as that of the driving permanent magnet placed on the rotor or a magnet coupling having the same number of poles as that of the driving permanent magnet placed on the rotor 81 are placed outside of the casing and magnetic levitation rotation is realized.

As a result, it is possible to solve conventional problems in which abrasion powder is generated from a sliding unit in a pump or a bearing unit seizes. In addition, by having a magnetically-levitated pump, a maintenance-free pump can be acquired and therefore a longer operating life and improvement in the durability of the pump can be achieved. Note that the rotating method is not limited to the methods explained above.

By having the configuration explained above, a strong control force in the radial direction can be generated with a small amount of electrical current by the first bias flux and the second bias flux of a permanent magnet and a commutating pole permanent magnet, and suspending of the axial direction/tilt with passive stability caused by the strong magnetic attraction of the permanent magnet and the commutating pole permanent magnet results in more controllability, and as a result, higher stiffness, higher efficiency, reduction in size and simplification of the control system can be achieved.

By utilizing it as a magnetic bearing of a motor, the magnetic bearing, that is, the bearing of the present invention, can be utilized instead of a contact-type bearing such as a roller bearing or a sliding bearing being used as a bearing of the conventional motors. As a result, a maintenance-free bearing can be acquired, and this is effective in reducing vibration, noise and other such problems generated by rotation.

It should be noted that combining of the magnetic bearing in the radial direction and the magnetic bearing in the axial direction allows the simultaneous use of the magnetic bearing in the radial direction and the magnetic bearing in the axial direction, enabling control to be performed on five axes.

The shape of the rotor explained in the above Embodiments 1-4 is not limited to a torus shape, and it can take any form, such as a disk shape.

The present invention, additionally, is not limited to the above embodiments, but various improvements and modification can be made without departing from the scope of the present invention.

What is claimed is:

1. A hybrid magnetic bearing having a rotor that rotates while being suspended without contact by a controlling magnetic force of a plurality of electromagnets and permanent magnets, wherein the electromagnet has a main pole and a commutating pole, the commutating pole has a commutating pole permanent magnet, the main pole and the commutating pole are provided in a protruding condition radially to the rotor approximately parallel to each other at predetermined intervals, and a control coil is wound around a core (magnetic core) having the main pole and the commutating pole, two of the electromagnets are arranged oppositely to each other across the rotor in an approximate horizontal position, and the rotor is arranged so as to have a predetermined gap with the main pole and the commutating pole, and the permanent magnet is provided between the adjacent electromagnets; wherein the commutating pole permanent magnet is arranged so that its polarity is the same as the polarity of the commutating pole in the electromagnet placed oppositely, and the polarity is different from the polarity of the commutating pole of the adjacent electromagnet, the polarity of the permanent magnet arranged so as to sandwich the electromagnet is placed so that a polarity different from the polarity of an end of the commutating pole permanent magnet is oriented toward the electromagnet.

2. The hybrid magnetic bearing according to claim 1, wherein the control coil generates a control flux in the same or opposite direction to a first bias flux generated by the commutating pole permanent magnet and a second bias flux generated by the permanent magnet, and controls the position of the rotor.

3. The hybrid magnetic bearing according to claim 2, wherein control flux detects a change in the second bias flux with a flux sensor, and adjusts an electrical current of the control coil according to the detected result.

4. The hybrid magnetic bearing according to claim 2, wherein
the control flux detects a change in the position of the rotor with a displacement sensor, and adjusts the electrical current of the control coil according to the detected result.

5. The hybrid magnetic bearing according to claim 1, wherein
the commutating pole permanent magnet is arranged within a range from the end of the commutating pole to a core between the main pole and the commutating pole.

6. The hybrid magnetic bearing according to claim 1, wherein
the rotor has two salient poles on a side plane facing the main pole and the commutating pole so that the poles are opposite to the main pole and the commutating pole.

7. A hybrid magnetic bearing for a magnetically levitated pump having a rotor that rotates while being suspended without contact by a controlling magnetic force of a plurality of electromagnets and permanent magnets, wherein
the electromagnet has a main pole and a commutating pole, the commutating pole has a commutating pole permanent magnet, the main pole and the commutating pole are provided in a protruding condition radially to the rotor approximately parallel to each other at predetermined intervals, and a control coil is wound around a core (magnetic core) having the main pole and the commutating pole,
two of the electromagnets are arranged oppositely to each other across the rotor in an approximately horizontal position, and the rotor is arranged so as to have a predetermined gap with the main pole and the commutating pole, and
the permanent magnet is provided between the adjacent electromagnets; wherein
the commutating pole permanent magnet is arranged so that its polarity is the same as the polarity of the commutating pole in the electromagnet placed oppositely, and the polarity is different from the polarity of the commutating pole of the adjacent electromagnet,
the polarity of the permanent magnet arranged so as to sandwich the electromagnet is placed so that a polarity different from the polarity of an end of the commutating pole permanent magnet is oriented toward the electromagnet.

* * * * *